(12) United States Patent
Matsushita et al.

(10) Patent No.: US 11,279,373 B2
(45) Date of Patent: Mar. 22, 2022

(54) AUTOMATED DRIVING SYSTEM

(71) Applicant: TOYOTA JIDOSHA KABUSHIKI KAISHA, Toyota (JP)

(72) Inventors: Naoki Matsushita, Nagoya (JP); Koji Taguchi, Sagamihara (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 167 days.

(21) Appl. No.: 16/353,468

(22) Filed: Mar. 14, 2019

(65) Prior Publication Data

US 2019/0300016 A1 Oct. 3, 2019

(30) Foreign Application Priority Data

Mar. 29, 2018 (JP) .............................. JP2018-064096

(51) Int. Cl.
*B60W 50/08* (2020.01)
*B60W 50/14* (2020.01)
(Continued)

(52) U.S. Cl.
CPC ...... *B60W 50/085* (2013.01); *B60W 50/0098* (2013.01); *B60W 50/14* (2013.01); *G05D 1/0061* (2013.01); *G05D 1/0088* (2013.01); *B60W 2510/205* (2013.01); *B60W 2520/10* (2013.01); *B60W 2520/105* (2013.01); *B60W 2554/801* (2020.02)

(58) Field of Classification Search
CPC .................................................. B60W 50/08
See application file for complete search history.

(56) References Cited

U.S. PATENT DOCUMENTS

2012/0029801 A1 2/2012 Yano et al.
2015/0025731 A1* 1/2015 Uehara ................ B60W 50/14
701/23

(Continued)

FOREIGN PATENT DOCUMENTS

JP 2007-187090 A 7/2007
JP 2012-33107 A 2/2012
JP 2016-20177 A 2/2016

OTHER PUBLICATIONS

Mark Smith, Bisection Method, 1998, MIT (Year: 1998).*

*Primary Examiner* — Kelly D Williams
(74) *Attorney, Agent, or Firm* — Sughrue Mion, PLLC (57) ABSTRACT

During automated driving of a vehicle, an automated driving system searches for a driver's acceptable range being a range of an automated driving parameter accepted by a driver of the vehicle. A positive response is the driver's response when the automated driving parameter is within the driver's acceptable range. A negative response is the driver's response when the automated driving parameter is beyond the driver's acceptable range. The automated driving system executes: parameter change processing that actively changes the automated driving parameter; response determination processing that determines whether the driver's response to the parameter change processing is the positive response or the negative response based on a result of detection by a driver response detection device; and search processing that repeatedly executes the parameter change processing and the response determination processing to search for the driver's acceptable range.

8 Claims, 6 Drawing Sheets

(51) Int. Cl.
    *G05D 1/00*     (2006.01)
    *B60W 50/00*     (2006.01)

(56) References Cited

U.S. PATENT DOCUMENTS

| | | | | |
|---|---|---|---|---|
| 2016/0221575 A1* | 8/2016 | Posch | ............... | B60W 30/12 |
| 2017/0365165 A1* | 12/2017 | Landfors | ............... | G06F 16/182 |
| 2018/0208209 A1* | 7/2018 | Al-Dahle | ............... | B60W 10/22 |

* cited by examiner

AUTOMATED DRIVING SYSTEM

BACKGROUND

Technical Field

The present disclosure relates to an automated driving system installed on a vehicle.

BACKGROUND ART

Patent Literature 1 discloses a driving control device that executes driving control of a vehicle. During manual driving of the vehicle by a driver, the driving control device acquires and stores road information, vehicle information, and driver information. Then, the driving control device analyzes the stored road information, vehicle information, and driver information to learn habit, preference, and tendency of the driver. When executing the driving control, the driving control device refers to the learned data to calculate an optimum driving control condition matching to the driver's feeling.

Patent Literature 2 discloses a driving characteristic determination device that determines a driving characteristic of a driver. The driving characteristic determination device determines the driving characteristic of the driver based on a speed and acceleration/deceleration of a vehicle in a section from start to stop of the vehicle.

LIST OF RELATED ART

Patent Literature 1: Japanese Unexamined Patent Application Publication No. JP-2016-020177
Patent Literature 2: Japanese Unexamined Patent Application Publication No. JP-2012-033107

SUMMARY

It is desirable to consider a driver's preference when executing automated driving of a vehicle. However, vehicle running preferred by the driver during the automated driving does not necessarily accord with vehicle running during manual driving. The reason is that the manual driving is under control of the driver, but the automated driving is not under control of the driver. Therefore, simply imitating the driver's manual driving during the automated driving as in the case of the above-mentioned Patent Literature 1 may cause the driver to feel senses of strangeness and discomfort about the automated driving.

An object of the present disclosure is to provide a technique that can search for a driver's preference in regard to automated driving.

A first disclosure is directed to an automated driving system installed on a vehicle.

The automated driving system includes:
an automated driving control device configured to control automated driving of the vehicle; and
a driver response detection device configured to detect a state of or an operation by a driver of the vehicle.

An automated driving parameter is a parameter related to the automated driving.

A driver's acceptable range is a range of the automated driving parameter accepted by the driver.

A positive response is the state of or the operation by the driver in a case where the automated driving parameter is within the driver's acceptable range.

A negative response is the state of or the operation by the driver in another case where the automated driving parameter is beyond the driver's acceptable range.

The automated driving control device is further configured to execute acceptable range search processing that searches for the driver's acceptable range, during the automated driving.

The acceptable range search processing includes:
parameter change processing that actively changes the automated driving parameter;
response determination processing that determines whether a response of the driver to the parameter change processing is the positive response or the negative response based on a result of detection by the driver response detection device; and
search processing that repeatedly executes the parameter change processing and the response determination processing to search for the driver's acceptable range.

A second disclosure further has the following feature in addition to the first disclosure.

After completion of the acceptable range search processing, the automated driving control device executes the automated driving by using the automated driving parameter included in the driver's acceptable range.

A third disclosure further has the following feature in addition to the first or second disclosure.

The automated driving system further includes an information acquisition device configured to acquire driving environment information indicating driving environment for the vehicle.

The automated driving control device calculates a safety level of travel of the vehicle based on the driving environment information.

The automated driving control device executes the acceptable range search processing in a period when the safety level is equal to or higher than a threshold.

A fourth disclosure further has the following feature in addition to any one of the first to third disclosures.

The automated driving parameter includes at least one of a vehicle speed, an acceleration, a deceleration, a steering speed, a start timing of acceleration control, a start timing of deceleration control, a start timing of steering control, an inter-vehicle distance, and a method of notifying the driver of a transition demand.

According to the present disclosure, during the automated driving, the automated driving system searches for the driver's acceptable range that is a range of the automated driving parameter accepted by the driver. More specifically, the automated driving system determines whether the driver's response is the positive response or the negative response while actively changing the automated driving parameter. It is thus possible to search for the driver's acceptable range, that is, the driver's preference in regard to the automated driving.

Furthermore, according to the present disclosure, since the automated driving system actively changes the automated driving parameter, it is possible to know the driver's response to a rare vehicle running pattern that is not performed in usual manual driving. In other words, it is possible to know the driver's response in a rare case (corner case) that scarcely occurs in usual manual driving. Such information of the driver's response in the rare case has a high utility value, which is preferable.

EMBODIMENTS

Embodiments of the present disclosure will be described below with reference to the attached drawings.

1. Outline

Figure 1:
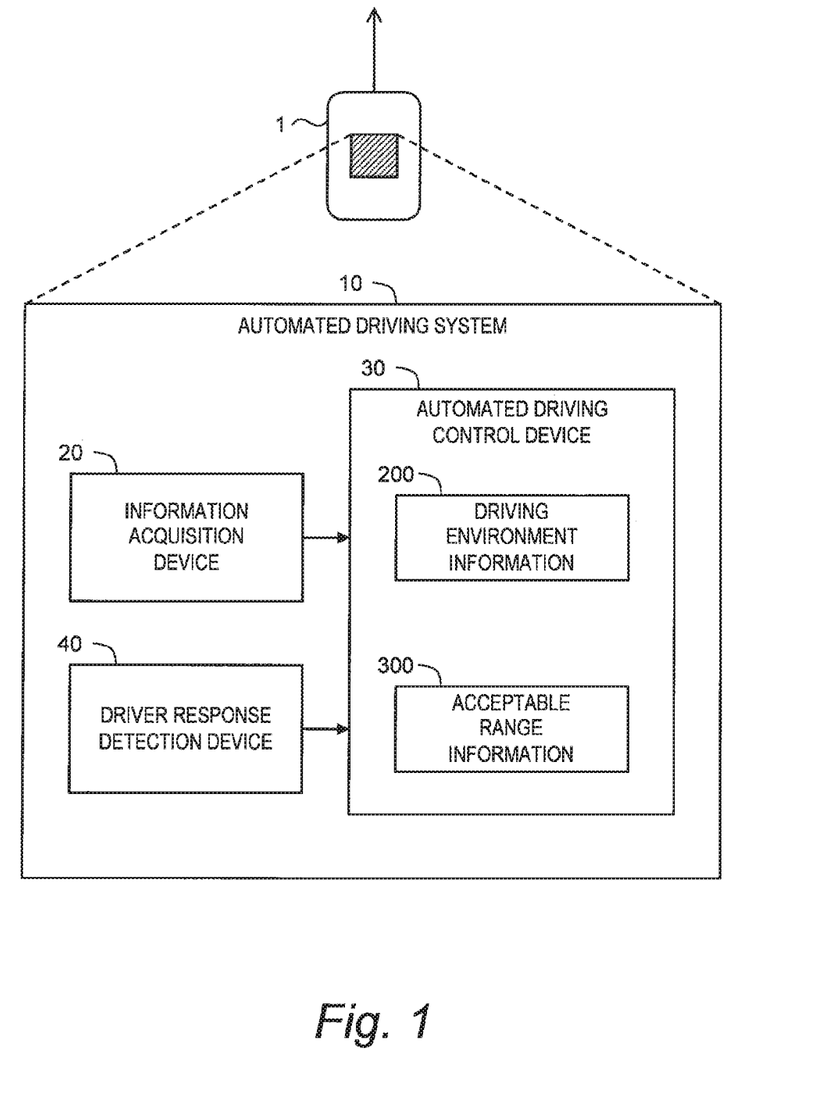
FIG. 1 is a conceptual diagram for explaining an outline of an automated driving system according to an embodiment of the present disclosure.

FIG. 1 is a conceptual diagram for explaining an outline of an automated driving system 10 according to the present embodiment. The automated driving system 10 is installed on a vehicle 1 and controls automated driving of the vehicle 1. More specifically, the automated driving system 10 includes an information acquisition device 20 and an automated driving control device 30.

The information acquisition device 20 acquires information necessary for the automated driving. The information necessary for the automated driving is information indicating driving environment for the vehicle 1, and the information is hereinafter referred to as "driving environment information 200".

The automated driving control device 30 controls the automated driving of the vehicle 1 based on the driving environment information 200. The automated driving control includes acceleration control, deceleration control, and steering control. Based on the driving environment information 200, the automated driving control device 30 determines a vehicle speed, an acceleration, a deceleration, a steering speed, a start timing of the acceleration control, a start timing of the deceleration control, a start timing of the steering control, an inter-vehicle distance, and so forth. In addition, the automated driving control device 30 notifies the driver of a transition demand (TD: Transition Demand) as needed.

A parameter related to the automated driving by the automated driving control device 30 is hereinafter referred to as an "automated driving parameter Pi" (i is an integer equal to or more than 1). The automated driving parameter Pi includes at least one of the vehicle speed, the acceleration, the deceleration, the steering speed, the start timing of the acceleration control, the start timing of the deceleration control, the start timing of the steering control, and the inter-vehicle distance. In addition, a method of notifying the driver of the transition demand can be included in the automated driving parameter Pi.

When the automated driving control device 30 executes the automated driving, it is desirable to consider a driver's preference. In other words, it is desirable that the automated driving control device 30 executes the automated driving by using the automated driving parameter Pi preferred by the driver. In the present embodiment, the driver's preference is defined by a "range" of the automated driving parameter Pi accepted by the driver. The range of the automated driving parameter Pi accepted by the driver is hereinafter referred to as a "driver's acceptable range RA".

Figure 2:
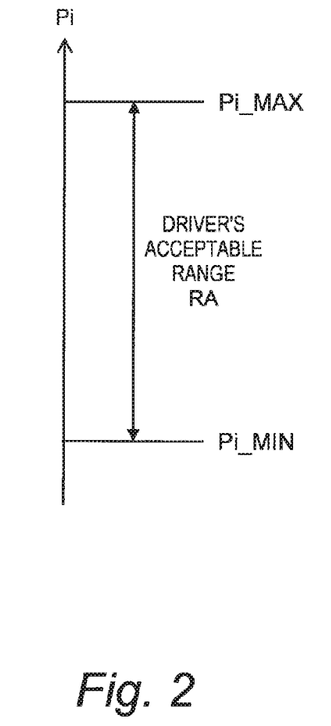
FIG. 2 is a conceptual diagram showing a driver's acceptable range of an automated driving parameter in the embodiment of the present disclosure.

FIG. 2 is a conceptual diagram showing the driver's acceptable range RA of the automated driving parameter Pi. The driver's acceptable range RA is defined by a range between an upper limit Pi_MAX and a lower limit Pi_MIN. In a case of the automated driving parameter Pi related to the start timing, one of an earliest timing and a slowest timing accepted by the driver is the upper limit Pi_MAX, and the other of them is the lower limit Pi_MIN. As to the method of notifying the driver of the transition demand, intensity of notification is quantified for example. For instance, when the notification method includes vibration, display, and alert, the vibration is the weakest notification method, and the alert is the strongest notification method.

When the automated driving parameter Pi is within the driver's acceptable range RA, the driver does not feel senses of strangeness and discomfort about the automated driving. On the other hand, when the automated driving parameter Pi is beyond the driver's acceptable range RA, the driver feels the senses of strangeness and discomfort about the automated driving. The driver's acceptable range RA is not uniform for all drivers but varies from driver to driver. It is therefore important to search for (find) the driver's acceptable range RA specific to each driver. Processing of searching for the driver's acceptable range RA is hereinafter referred to as "acceptable range search processing".

According to the present embodiment, the automated driving control device 30 executes the acceptable range search processing during the automated driving. More specifically, the automated driving control device 30 checks a response of the driver while "actively" changing the automated driving parameter Pi. To that end, the automated driving system 10 according to the present embodiment further includes a driver response detection device 40 as shown in FIG. 1.

The driver response detection device 40 detects a state of or an operation by the driver. Based on a result of the detection, it is possible to determine whether the driver responds positively or negatively to the automated driving parameter Pi, that is, whether the automated driving parameter Pi is within the driver's acceptable range RA or not. The state of or the operation by the driver in a case where the automated driving parameter Pi is within the driver's acceptable range RA is hereinafter referred to as a "positive response". On the other hand, the state of or the operation by the driver in a case where the automated driving parameter Pi is beyond the driver's acceptable range RA is hereinafter referred to as a "negative response". A typical example of the negative response is overriding by the driver. It can also be said that the positive response is other than the negative response.

During the automated driving, the automated driving control device 30 executes "parameter change processing" that actively changes the automated driving parameter Pi. Moreover, the automated driving control device 30 executes "response determination processing" that determines whether the driver's response to the parameter change processing is the positive response or the negative response based on a result of detection by the driver response detection device 40. The automated driving control device 30 can search for the driver's acceptable range RA specific to the driver, that is, the driver's preference by repeatedly executing the parameter change processing and the response determination processing. Information indicating the driver's acceptable range RA that is determined by the search processing is hereinafter referred to as "acceptable range information 300".

The acceptable range information 300 thus acquired is useful. For example, the acceptable range information 300 is used in the automated driving by the automated driving control device 30. More specifically, the automated driving control device 30 refers to the acceptable range information 300 and executes the automated driving by using the automated driving parameter Pi included in the driver's acceptable range RA. It is thus possible to realize the automated driving of excellent ride quality for the driver. This leads to increase in the driver's confidence in the automated driving system 10.

It can also be considered to accumulate the acceptable range information 300 regarding a larger number of drivers. The accumulated acceptable range information 300 is useful, for example, for learning of artificial intelligence executing automated driving control, development of service using an automated driving vehicle, and so forth.

According to the present embodiment, as described above, the automated driving system 10 executes the acceptable range search processing during the automated driving. More specifically, the automated driving system 10 determines whether the driver's response is the positive response or the negative response while actively changing the automated driving parameter Pi. It is thus possible to search for the driver's acceptable range RA specific to the driver, that is, the driver's preference in regard to the automated driving.

Furthermore, according to the present embodiment, since the automated driving system 10 actively changes the automated driving parameter Pi, it is possible to know the driver's response to a rare vehicle running pattern that is not performed in usual manual driving. In other words, it is possible to know the driver's response in a rare case (corner case) that scarcely occurs in usual manual driving. Such information of the driver's response in the rare case has a high utility value. For example, the information of the driver's response in the rare case is useful for learning of artificial intelligence executing automated driving control, development of service using an automated driving vehicle, and so forth.

As a comparative example, let us consider the conventional technique disclosed in the above-mentioned Patent Literature 1 (Japanese Unexamined Patent Application Publication No. JP-2016-020177). According to the comparative example, the driver's preference is learned based on information acquired during manual driving of the vehicle by the driver. However, vehicle running preferred by the driver during the automated driving does not necessarily accord with vehicle running during the manual driving. The reason is that the manual driving is under control of the driver, but the automated driving is not under control of the driver. Therefore, simply imitating the driver's manual driving during the automated driving as in the case of the above-mentioned Patent Literature 1 may cause the driver to feel senses of strangeness and discomfort about the automated driving. Moreover, in the case of Patent Literature 1, it is impossible to know the driver's response in a rare case that scarcely occurs in usual manual driving.

Hereinafter, the automated driving system 10 according to the present embodiment will be described in more detail.

2. Automated Driving System 2-1. Configuration Example

Figure 3:
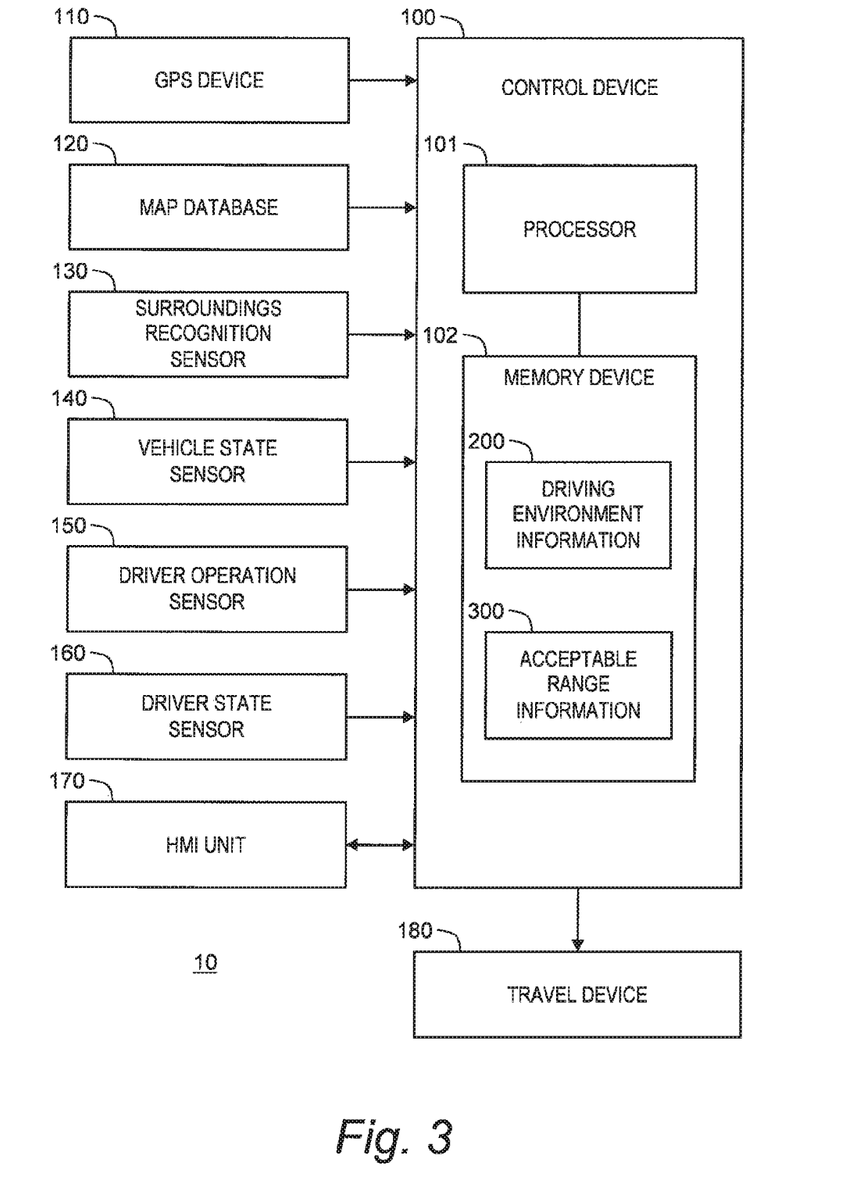
FIG. 3 is a block diagram showing a configuration example of the automated driving system according to the embodiment of the present disclosure.

FIG. 3 is a block diagram showing a configuration example of the automated driving system 10 according to the present embodiment. The automated driving system 10 includes a control device (controller) 100, a GPS (Global Positioning System) device 110, a map database 120, a surroundings recognition sensor 130, a vehicle state sensor 140, a driver operation sensor 150, a driver state sensor 160, an HMI (Human Machine Interface) unit 170, and a travel device 180.

The control device (controller) 100 is a microcomputer provided with a processor 101 and a memory device 102. The control device 100 is also called an ECU (Electronic Control Unit). A variety of processing by the control device 100 is achieved by the processor 101 executing a control program stored in the memory device 102.

The GPS device 110 receives signals transmitted from a plurality of GPS satellites and calculates a position and an orientation of the vehicle 1 based on the received signals.

Map information is recorded in the map database 120. The map information includes information of lane geometries, lane attributes, and so forth. The map database 120 is achieved by a memory device.

The surroundings recognition sensor 130 recognizes a situation around the vehicle 1. The surroundings recognition sensor 130 is exemplified by a LIDAR (Laser Imaging Detection and Ranging), a radar, a camera (imaging device), and so forth. The LIDAR uses laser lights to detect a target around the vehicle 1. The radar uses radio waves to detect a target around the vehicle 1. The camera images a situation around the vehicle 1.

The vehicle state sensor 140 detects a state of the vehicle 1. For example, the vehicle state sensor 140 includes a vehicle speed sensor, a lateral acceleration sensor, a yaw rate sensor, and so forth. The vehicle speed sensor detects a speed of the vehicle 1, that is, the vehicle speed. The lateral acceleration sensor detects a lateral acceleration of the vehicle 1. The yaw rate sensor detects a yaw rate of the vehicle 1.

The driver operation sensor 150 detects a driving operation by the driver (hereinafter referred to as a "driver operation"). The driver operation includes a steering operation, an acceleration operation, and a braking operation. For example, the driver operation sensor 150 includes a steering angle sensor, a torque sensor, an accelerator pedal sensor, and a brake sensor. The steering angle sensor detects a steering angle of a steering wheel. The torque sensor detects a steering torque. The accelerator pedal sensor detects a stroke amount of an accelerator pedal. The brake sensor detects a stroke amount of a brake pedal.

The driver state sensor 160 detects a state of the driver. For example, the driver state sensor 160 includes a steering wheel touch sensor, a biological information sensor, and a driver monitor. The steering wheel touch sensor detects whether or not the driver is holding the steering wheel. The biological information sensor detects biological information such as pulse, brain waves, and the like of the driver. The driver monitor includes an imaging device installed at a position where it can image a face of the driver. The driver monitor detects an orientation of the face, a direction of eyes, an eye opening/closing degree, and the like of the driver by analyzing an image obtained by the imaging device.

The HMI unit 170 is an interface for proving the driver with information and receiving information from the driver. More specifically, the HMI unit 170 includes an input device and an output device. The input device is exemplified by a touch panel, a switch, a microphone, and the like. The output device is exemplified by a display device, a speaker, and the like.

The travel device 180 includes a steering device, a driving device, and a braking device. The steering device turns wheels. The driving device is a power source that generates a driving force. The driving device is exemplified by an engine and an electric motor. The braking device generates a braking force.

2-2. Information Acquisition Device 20

The control device 100 executes information acquisition processing that acquires the driving environment information 200 necessary for the automated driving. The driving environment information 200 is stored in the memory device 102, and read out and used as appropriate.

Figure 4:
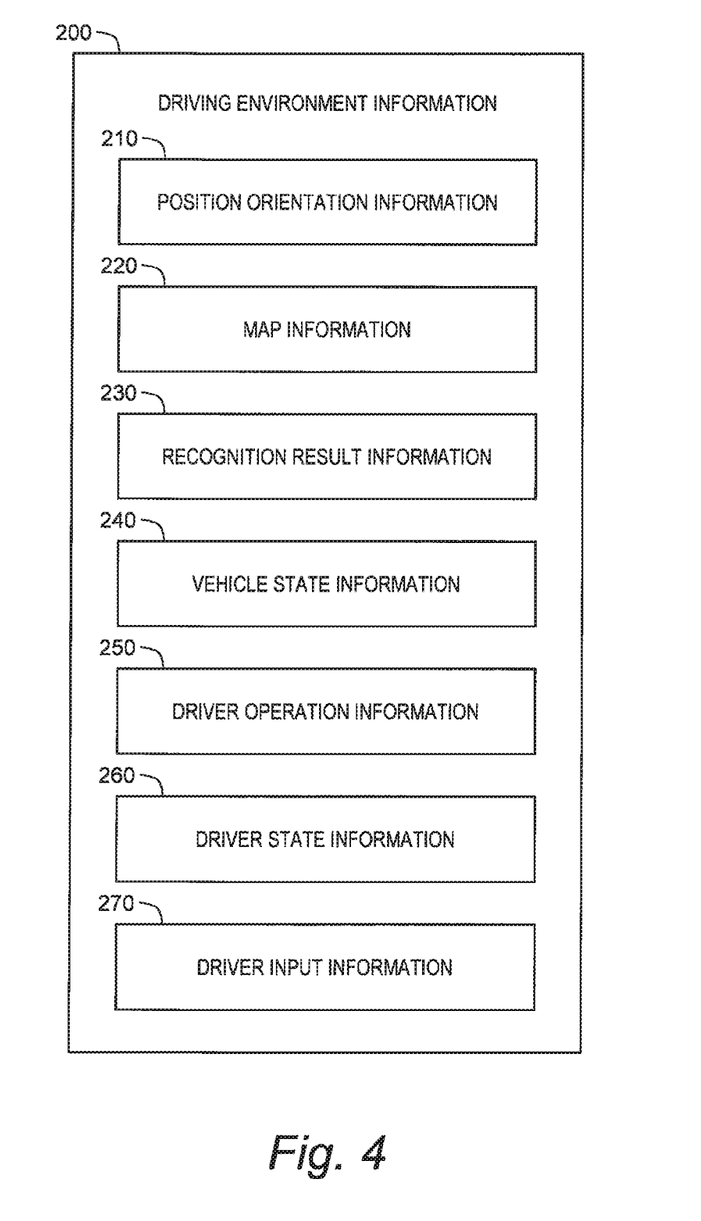
FIG. 4 is a block diagram showing an example of driving environment information used in the automated driving system according to the embodiment of the present disclosure.

FIG. 4 shows an example of the driving environment information 200 in the present embodiment. The driving environment information 200 includes position orientation information 210, map information 220, recognition result information 230, vehicle state information 240, driver operation information 250, driver state information 260, and driver input information 270.

The position orientation information 210 indicates the position and the orientation of the vehicle 1. The control device 100 acquires the position orientation information 210 from the GPS device 110.

The map information 220 includes information of lane geometries, lane attributes, and so forth. The control device 100 acquires the map information 220 of a necessary region based on the position orientation information 210 and the map database 120.

The recognition result information 230 indicates a result of recognition by the surroundings recognition sensor 130. The recognition result information 230 includes target information regarding a target around the vehicle 1. The target around the vehicle 1 is exemplified by a surrounding vehicle, a white line, a roadside structure, a sign, and so forth. The target information includes a relative position, a relative speed, and the like of the detected target as seen from the vehicle 1. In particular, a distance between the vehicle 1 and the surrounding vehicle is recognized as the inter-vehicle distance.

The vehicle state information 240 indicates the state of the vehicle 1. For example, the vehicle state information 240 indicates the vehicle speed, the acceleration, the deceleration, the yaw rate, and so forth. The control device 100 acquires the vehicle state information 240 based on a result of detection by the vehicle state sensor 140.

The driver operation information 250 indicates a content of the driver operation. The driver operation includes the steering operation, the acceleration operation, and the braking operation. The control device 100 acquires the driver operation information 250 based on a result of detection by the driver operation sensor 150.

The driver state information 260 indicates the driver state. For example, the driver state information 260 indicates whether or not the driver is holding the steering wheel. The driver state information 260 may include the biological information such as pulse, brain waves, and the like of the driver. The driver state information 260 may include appearance information such as the orientation of the face, the direction of eyes, the eye opening/closing degree, and the like of the driver. The control device 100 acquires the driver state information 260 based on a result of detection by the driver state sensor 160.

The driver input information 270 is information input from the driver through the HMI unit 170.

It can be said that the control device 100, the GPS device 110, the map database 120, the surroundings recognition sensor 130, the vehicle state sensor 140, the driver operation sensor 150, the driver state sensor 160, and the HMI unit 170 constitute the "information acquisition device 20" shown in FIG. 1.

2-3. Automated Driving Control Device 30

The control device 100 executes the automated driving control based on the driving environment information 200. More specifically, the control device 100 creates a travel plan based on the driving environment information 200. The travel plan includes a travel route to a destination that is determined based on the position orientation information 210 and the map information 220. In addition, the travel plan includes a lane-level target path (target trajectory). The target path is determined based on the position orientation information 210, the map information 220, the recognition result information 230, and the vehicle state information 240.

The control device 100 executes the automated driving control such that the vehicle 1 travels in accordance with the travel plan. The automated driving control includes the acceleration control, the deceleration control, and the steering control. The control device 100 determines the vehicle speed, the acceleration, the deceleration, the steering speed, the start timing of the acceleration control, the start timing of the deceleration control, the start timing of the steering control, the inter-vehicle distance, and so forth. Then, the control device 100 appropriately actuates the travel device 180 (i.e. the driving device, the braking device, and the steering device) to perform the acceleration control, the deceleration control, and the steering control.

Moreover, the control device 100 requests the driver to take over the vehicle driving, as needed. More specifically, the control device 100 notifies the driver of the transition demand through the output device of the HMI unit 170. A method of notifying the driver of the transition demand is exemplified by vibration, display, and alert.

It can be said that the control device 100, the HMI unit 170, and the travel device 180 constitute the "automated driving control device 30" shown in FIG. 1.

2-4. Driver Response Detection Device 40

As described above, the negative response is the state of or the operation by the driver in the case where the automated driving parameter Pi is beyond the driver's acceptable range RA.

For example, the negative response is overriding by the driver. For example, the overriding includes at least one of the steering operation, the acceleration operation, the braking operation, and steering hold by the driver. The control device 100 can determine whether or not there is any driver operation based on the driver operation information 250. Moreover, the control device 100 can determine whether or not the driver is holding the steering wheel based on the driver state information 260.

As another example, the negative response is increase in tension of the driver. The increase in tension shows up in pulse increase, brain waves, and the like. The control device 100 can detect the increase in tension of the driver based on the driver state information 260 (specifically, the biological information).

As still another example, the negative response is twitchy driver behavior. The control device 100 can detect the twitchy driver behavior based on the driver state information 260 (specifically, the orientation of face, the direction of eyes, the eye opening/closing degree).

As still another example, the negative response is direct communication of the driver's negative intention. The driver communicates the driver's negative intention by using the input device of the HMI unit 170. The control device 100 can detect the driver's negative intention from the driver input information 270.

On the other hand, the positive response is the state of or the operation by the driver in the case where the automated driving parameter Pi is within the driver's acceptable range RA. For example, the positive response is that the overriding is not performed. It can also be said that the positive response is other than the above-described negative responses.

The positive response and the negative response with regard to the notification method of the transition demand are as follows. For example, the positive response is that the manual driving starts within a certain period of time from a notification timing of the transition demand. On the other hand, the negative response is that the manual driving does not start even after passage of the certain period of time from the notification timing of the transition demand.

It can be said that the control device 100, the driver operation sensor 150, the driver state sensor 160, and the HMI unit 170 constitute the "driver response detection device 40" shown in FIG. 1.

3. Example of Acceptable Range Search Processing

During the automated driving, the automated driving control device 30 executes the acceptable range search processing that searches for the driver's acceptable range RA specific to the driver. The acceptable range search processing is executed for each automated driving parameter Pi. That is, the driver's acceptable range RA is searched for (determined) for each automated driving parameter Pi.

Figure 5:
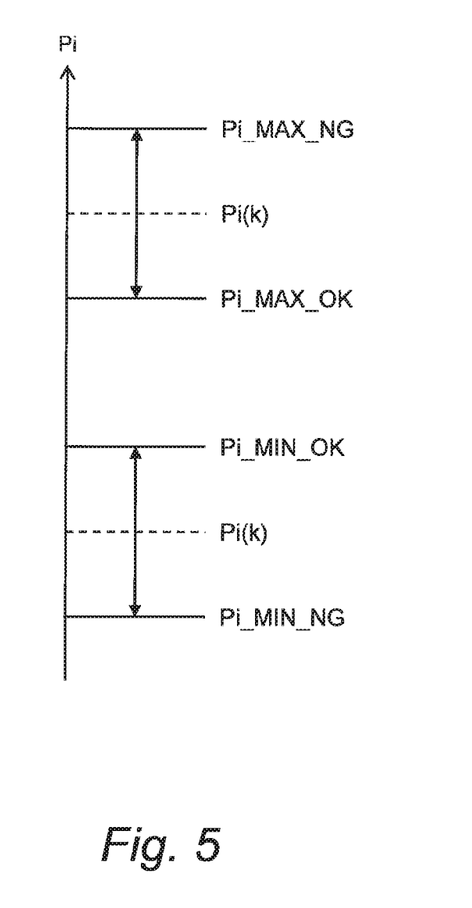
FIG. 5 is a conceptual diagram for explaining an example of acceptable range search processing according to the embodiment of the present disclosure.

FIG. 5 is a conceptual diagram for explaining an example of the acceptable range search processing. The driver's acceptable range RA regarding a certain automated driving parameter Pi is a range between an upper limit Pi_MAX and a lower limit Pi_MIN. The upper limit Pi_MAX and the lower limit Pi_MIN are searched for (determined) separately from each other. For example, each of the upper limit Pi_MAX and the lower limit Pi_MIN is searched for by a bisection method. A search range for the upper limit Pi_MAX is represented by Pi_MAX_OK to Pi_MAX_NG. A search range for the lower limit Pi_MIN is represented by Pi_MIN_OK to Pi_MIN_NG.

Figure 6:
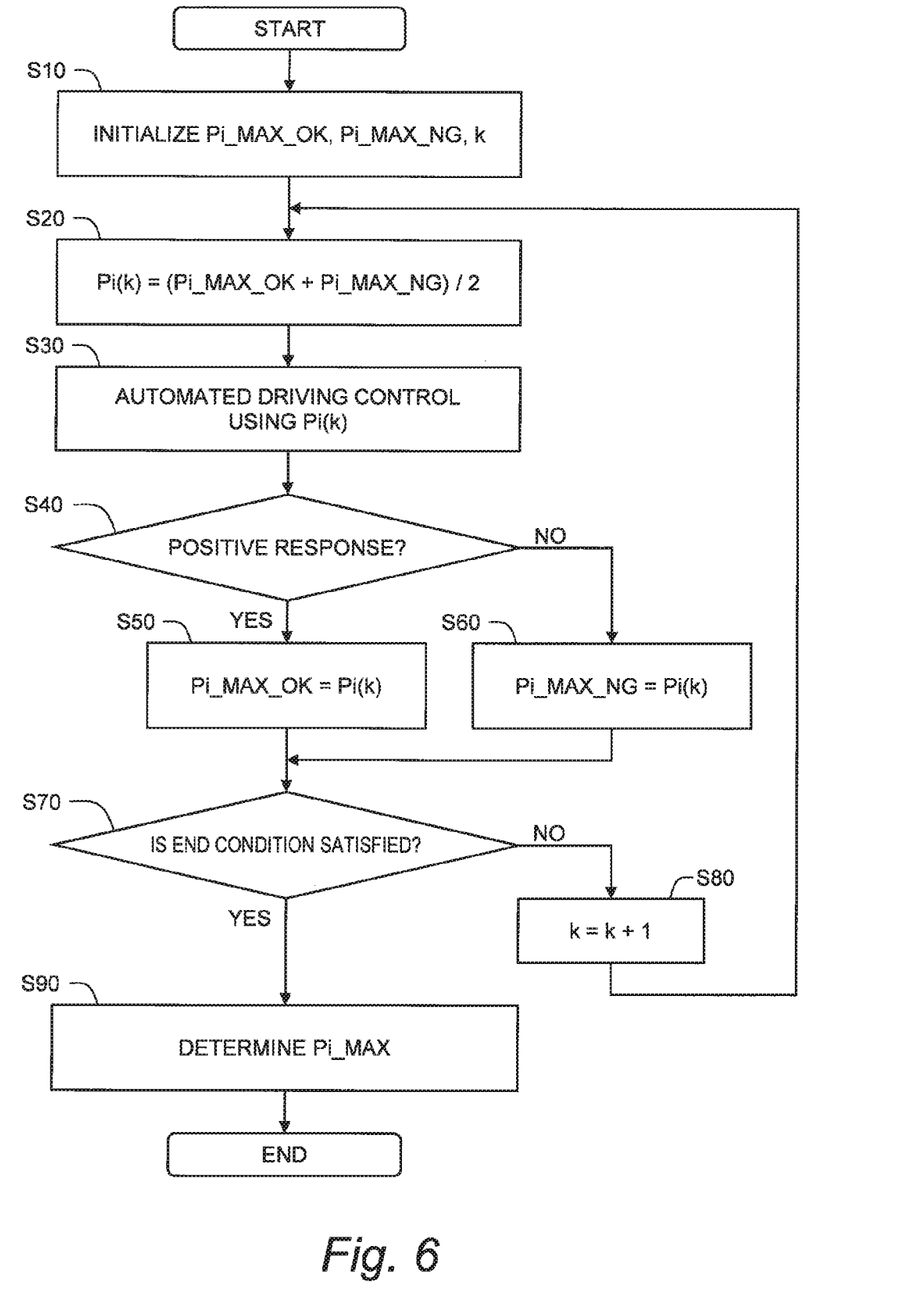
FIG. 6 is a flow chart showing an example of the acceptable range search processing according to the embodiment of the present disclosure.

FIG. 6 is a flow chart showing an example of the acceptable range search processing. Searching for the upper limit Pi_MAX will be described with reference to FIGS. 5 and 6. The same applies to a method of searching for the lower limit Pi_MIN.

In Step S10, the automated driving control device 30 initializes Pi_MAX_OK and Pi_MAX_NG. An initial value of Pi_MAX_OK is set to be sufficiently smaller than an automated driving parameter Pi that is generally considered as large. An initial value of Pi_MAX_NG is set to be sufficiently larger than the automated driving parameter Pi that is generally considered as large. A parameter k also is initialized to zero.

In Step S20, the automated driving control device 30 selects an automated driving parameter Pi(k) from the search range Pi_MAX_OK to Pi_MAX_NG. For example, the automated driving control device 30 calculates the automated driving parameter Pi(k) in accordance with the following Equation (1).

$$Pi(k)=(Pi\_MAX\_OK+Pi\_MAX\_NG)/2 \quad \text{Equation (1):}$$

In Step S30, the automated driving control device 30 executes the automated driving control by using the automated driving parameter Pi(k).

In Step S40, the automated driving control device 30 executes the response determination processing. That is, the automated driving control device 30 determines whether the driver's response is the positive response or the negative response based on the result of detection by the driver response detection device 40.

When the driver's response is the positive response (Step S40; Yes), the processing proceeds to Step S50. In Step S50, the automated driving control device 30 updates Pi_MAX_OK to the current automated driving parameter Pi(k). After that, the processing proceeds to Step S70.

On the other hand, when the driver's response is the negative response (Step S40; No), the processing proceeds to Step S60. In Step S60, the automated driving control device 30 updates Pi_MAX_NG to the current automated driving parameter Pi(k). After that, the processing proceeds to Step S70.

In Step S70, the automated driving control device 30 determines whether or not an end condition is satisfied. For example, the end condition is that Pi_MAX_OK and Pi_MAX_NG are equal. Alternatively, the end condition is that a difference between Pi_MAX_OK and Pi_MAX_NG is less than a minute value $\varepsilon$.

When the end condition is not satisfied (Step S70; No), the automated driving control device 30 increments the parameter k (Step S80). After that, the processing returns back to the above-described Step S20. That is, the automated driving parameter Pi(k) changes.

On the other hand, when the end condition is satisfied (Step S70; Yes), the automated driving control device 30 determines the upper limit Pi_MAX. For example, the automated driving control device 30 determines an average value of Pi_MAX_OK and Pi_MAX_NG as the upper limit Pi_MAX.

In this manner, the automated driving control device 30 checks whether the driver's response is the positive response or the negative response while actively changing the automated driving parameter Pi. It is thereby possible to search for the driver's acceptable range RA. Moreover, using the bisection method makes it possible to efficiently search for the driver's acceptable range RA.

It should be noted that the acceptable range search processing is preferably executed under a condition where the vehicle 1 is in a safe state. The automated driving control device 30 calculates a safety level of travel of the vehicle 1 based on the driving environment information 200. For example, the automated driving control device 30 calculates the safety level based on the recognition result information 230 indicating the result of recognition by the surroundings recognition sensor 130. The safety level is higher as the number of surrounding vehicles is smaller, and the safety level is lower as the number of surrounding vehicles is larger. The safety level is higher as the inter-vehicle distance is larger, and the safety level is lower as the inter-vehicle distance is smaller. The automated driving control device 30 executes the acceptable range search processing in a period when the safety level is equal to or higher than a threshold. As a result, it is possible to suppress influence of the acceptable range search processing on the automated driving control.

4. Use of Acceptable Range Information

The acceptable range information 300 (see FIG. 1) indicates the driver's acceptable range RA that is obtained by the acceptable range search processing described above. That is, the acceptable range information 300 indicates the driver's preference in regard to the automated driving. The acceptable range information 300 is useful.

For example, the acceptable range information 300 is used in the automated driving by the automated driving control device 30. More specifically, after completion of the acceptable range search processing, the automated driving control device 30 refers to the acceptable range information 300 and executes the automated driving by using the automated driving parameter Pi included in the driver's acceptable range RA. It is thus possible to realize the automated driving of excellent ride quality for the driver. This leads to increase in the driver's confidence in the automated driving system 10.

As another example, the acceptable range information 300 is used when the driver of the vehicle 1 gets on another vehicle (e.g. taxi) as a user. More specifically, the user provides the acceptable range information 300 to an automated driving system or a driver of said another vehicle. The automated driving system or the driver of said another vehicle drives said another vehicle in consideration of the acceptable range information 300. As a result, driving of excellent ride quality for the user is realized also in said another vehicle.

It can also be considered to accumulate the acceptable range information 300 regarding a larger number of drivers. The accumulated acceptable range information 300 is useful for learning of artificial intelligence executing automated driving control, development of service using an automated driving vehicle, and so forth. In particular, the information of the driver's response in the rare case (corner case) is useful.

What is claimed is:

1. An automated driving system installed on a vehicle, the automated driving system comprising:
an electronic control unit (ECU) provided with a processor and a memory device programmed to:
control automated driving of the vehicle; and
detect a state of, or an operation by, a driver of the vehicle,
wherein:
an automated driving parameter is a parameter related to the automated driving;
a driver's acceptable range is a range of the automated driving parameter accepted by the driver;
a positive response is the state of, or the operation by, the driver in a case where the automated driving parameter is within the driver's acceptable range;
a negative response is the state of, or the operation by, the driver in another case where the automated driving parameter is beyond the driver's acceptable range;
the ECU is further programmed to execute acceptable range search processing that searches for the driver's acceptable range; and
the acceptable range search processing includes:
setting an initial driver's acceptable range;
parameter change processing that actively changes the automated driving parameter beyond the initial driver's acceptable range;
response determination processing that determines whether a response of the driver to the parameter change processing is the positive response or the negative response based on the detected state of, or the detected operation by, the driver of the vehicle;
update processing that updates the initial driver's acceptable range based on a result of the response determination processing;
search processing that repeatedly executes the parameter change processing, the response determination processing, and the update processing to search for the driver's acceptable range.

2. The automated driving system according to claim 1, wherein after completion of the acceptable range search processing, the ECU executes the automated driving by using the automated driving parameter included in the driver's acceptable range.

3. The automated driving system according to claim 1, wherein the automated driving parameter includes at least one of a vehicle speed, an acceleration, a deceleration, a steering speed, a start timing of acceleration control, a start timing of deceleration control, a start timing of steering control, an inter-vehicle distance, and a method of notifying the driver of a transition demand.

4. The automated driving system according to claim 1, wherein
the parameter change processing changes the automated driving parameter within a search range that is beyond the initial driver's acceptable range.

5. The automated driving system according to claim 4, wherein
the search range is from a first value being a limit of the initial driver's acceptable range to a second value being beyond the limit of the initial driver's acceptable range.

6. The automated driving system according to claim 5, wherein
the parameter change processing includes selecting an automated driving parameter from the search range,
the update processing includes:
updating the limit of the initial driver's acceptable range to the selected automated driving parameter when the response of the driver is the positive response; and
updating the second value to the selected automated driving parameter when the response of the driver is the negative response.

7. The automated driving system according to claim 6, wherein
the parameter change processing includes selecting an average value of the first value and the second value as the selected automated driving parameter.

8. The automated driving system according to claim 1, wherein the ECU is further programmed to:
acquire driving environment information indicating a driving environment for the vehicle;
calculate a safety level of travel of the vehicle based on the driving environment information; and
wherein the acceptable search range processing is executed in a period when the safety level is equal to or higher than a threshold during the automated driving.

* * * * *